United States Patent
Lu et al.

(10) Patent No.: US 9,465,934 B2
(45) Date of Patent: Oct. 11, 2016

(54) CONTROL METHOD FOR ACCESSING JAVA CARD OBJECT

(71) Applicant: FEITIAN TECHNOLOGIES CO., LTD., Beijing (CN)

(72) Inventors: Zhou Lu, Beijng (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 14/345,425

(22) PCT Filed: Sep. 24, 2013

(86) PCT No.: PCT/CN2013/084042
§ 371 (c)(1),
(2) Date: Mar. 18, 2014

(87) PCT Pub. No.: WO2014/101495
PCT Pub. Date: Jul. 3, 2014

(65) Prior Publication Data
US 2015/0286818 A1    Oct. 8, 2015

(30) Foreign Application Priority Data

Dec. 26, 2012 (CN) .......................... 2012 1 0574908

(51) Int. Cl.
*G06F 7/04*    (2006.01)
*G06F 17/30*    (2006.01)
(Continued)

(52) U.S. Cl.
CPC .............. *G06F 21/50* (2013.01); *G06F 21/53* (2013.01); *G06F 2221/033* (2013.01)

(58) Field of Classification Search
CPC .... G06F 9/45504; G06F 21/53; G06F 21/51; G06F 21/52; G06F 21/50; G06F 9/45508; G06F 2221/033
See application file for complete search history.

(56) References Cited

U.S. PATENT DOCUMENTS 7,232,073 B1 *   6/2007   de Jong .................. G06F 9/445
                                                              235/382
7,685,586 B1    3/2010   Foley
(Continued)

FOREIGN PATENT DOCUMENTS

CN      101051291 A    10/2007
CN      101777061 A    7/2010
(Continued)

OTHER PUBLICATIONS

Marc Eluard, Thomas Jensen, "Secure Object Flow Analysis for Java Card", Proceedings of the 5th Smart Card Research and Advanced Application Conference, San Jose, California, USA, Nov. 21-22, 2002.*

(Continued)

*Primary Examiner* — Michael S McNally
*Assistant Examiner* — Amie C Lin
(74) *Attorney, Agent, or Firm* — Ohlandt, Greeley, Ruggiero & Perle, LLP (57) ABSTRACT

It is provided a control method for accessing a Java card object, which includes: obtaining, by a Java card virtual machine, a type of a current accessing object according to a current execution instruction, and performing corresponding operation according to the type of the current accessing object or prompting an exception. The multi-application security management of the Java card can be achieved.

16 Claims, 2 Drawing Sheets

(51) Int. Cl.
*G06F 21/50* (2013.01)
*G06F 21/53* (2013.01)

(56) References Cited

U.S. PATENT DOCUMENTS

| | | | | |
|---|---|---|---|---|
| 2005/0102679 | A1* | 5/2005 | Susser | G06F 9/468 719/315 |
| 2005/0149926 | A1* | 7/2005 | Saltz | G06F 9/468 718/1 |
| 2010/0306227 | A1* | 12/2010 | Fleming | G06F 17/30286 707/763 |
| 2012/0210320 | A1* | 8/2012 | Goetz | G06F 9/46 718/100 |
| 2013/0347030 | A1* | 12/2013 | Oh | H04N 21/478 725/32 |

FOREIGN PATENT DOCUMENTS

| | | |
|---|---|---|
| CN | 103093142 A | 5/2013 |
| EP | 1477877 A1 | 11/2004 |

OTHER PUBLICATIONS

Written Opinion of the International Searching Authority dated Dec. 26, 2013 corresponding to PCT/CN2013/084042 with English translation, 9 pp.

International Search Report dated Dec. 26, 2013 corresponding to PCT/CN2013/084042 with English translation, 9 pp.

\* cited by examiner

CONTROL METHOD FOR ACCESSING JAVA CARD OBJECT

This application claims the priority to Chinese Patent Application No. 201210574908.4, entitled "CONTROL METHOD FOR ACCESSING A JAVA OBJECT", filed with the Chinese Patent Office on Dec. 12, 2012, which is incorporated herein by reference in its entirety.

TECHNICAL FIELD

The present invention relates to the technical field of smart card technology.

BACKGROUND

With development in electronic government and electronic business, Java cards are more widely used. For meeting requirement on Multi-application card of a user, multi-application Java cards become popular currently, and the security problem among the applications becoming increasingly important.

In the existing art, one smart card has multiple applications, and thus it is needed to provided a control mechanism in the Java card platform to separate different applications, consequently, it is ensured that an applet can not access the object of other applet randomly.

SUMMARY

In order to solve the above-mentioned problem in the existing art, according to the embodiments of the present invention, it is provided a control method for accessing a Java card object.

The method includes:
step S1, interpreting and executing, by a Java card virtual machine, an applet of a current application;
step S2, obtaining, by the Java card virtual machine, an object reference provided by a current execution instruction in the applet, obtaining a current accessing object from a preset storage area according to the object reference, and reading an current context value of the current accessing object;
step S3, obtaining, by the Java card virtual machine, a type of the current accessing object according to the current execution instruction; if the type of the current accessing object is method invoking, going to step A1; if the type of the current accessing object is a READ/WRITE, going to step B1; otherwise, going to step C1;
step A1, determining whether the current accessing object is shared interface method invoking; if the current accessing object is shared interface method invoking, going to step A2; if the current accessing object is not shared interface method invoking, going to step B1;
step A2, determining whether a packet to which the current accessing object belongs is an active packet; if the packet to which the current accessing object belongs is an active packet, going to step S4; if the packet to which the current accessing object belongs is not an active packet, prompting an exception;
step B1, determining whether the current accessing object is prevented by a firewall or satisfied with a basic detecting condition; if the current accessing object is not prevented by the firewall or satisfies with the basic detecting condition, going to step S4; if the current accessing object is prevented by the firewall or does not satisfy with the basic detecting condition, prompting an exception;
step C1, determining whether the current accessing object satisfies with the basic detecting condition; if the current accessing object satisfies with the basic detecting condition, going to step S4; if the current accessing object does not satisfy with the basic detecting condition, prompting an exception; and
step S4, executing, by the Java card virtual machine the current executing instruction.

The step S2 includes:
obtaining, by the Java card virtual machine, the object reference from a running stack of the virtual machine according to a parameter in the current execution instruction, obtaining the current accessing object corresponding to the object reference from the preset storage area, and reading a second byte of the current accessing object as the current context value of the current accessing object.

The determining whether the current accessing object is shared interface method invoking in step A1 includes:
step 2-1), determining whether a first byte of the current execution instruction is a third preset value; if the first byte of the current execution instruction is the third preset value, going to next step; if the first byte of the current execution instruction is not the third preset value, the current accessing object is not shared interface method invoking;
step 2-2), obtaining a reference of the type of the current accessing object according to the current execution instruction and obtaining type information according to the reference; and
step 2-3), determining whether the current accessing object is shared interface method invoking according to a first byte of the type information.

The current accessing object is shared interface method invoking in the case where a second bit of the first byte of the type information is 1.

The determining whether the packet to which the current accessing object belongs is an active packet includes:
traversing, by the Java card virtual machine, all channels;
determining whether high 4 bits of the current context value of the current accessing object equal 1 to high 4 bits of a current context value stored in a channel; if high 4 bits of the current context value of the current accessing object equal to high 4 bits of the current context value stored in the channel, the packet to which the current accessing object belongs is an active packet; if high 4 bits of the current context value of the current accessing object does not equal to high 4 bits of the current context value stored in the channel, the packet to which the current accessing object belongs is not an active packet.

The object that is not prevented by the fire wall in Step B1 comprises an entry point object and a global array object.

The determining whether the current accessing object satisfies with the basic detecting condition in steps B1 and C1 includes:
the current execution is a system context or the current context value of the current accessing object equals to a current context value of the current execution context.

The step C1 includes:
step C1-1, determining whether the a current execution context is a system context; if the current execution context is a system context, going to step S4; if the current execution context is not a system context, going to Step C1-2;
step C1-2, determining whether the current context value of the current accessing object equals to the current context value of the current execution context; if the current context value of the current accessing object equals to the current context value of the current execution context, going to step S4; if the current context value of the current accessing object does not equal to the current context value of the current execution context, prompting an exception.

The step B1 includes:
determining whether the current accessing object is prevented by an a firewall; if the current accessing object is not prevented by the firewall, going to step S4; if the current accessing object is prevented by the firewall, going to step C1.

The determining whether the current execution context is a system context comprises: determining whether the current context value of the current execution environment is a second preset value.

The determining whether the current accessing object is prevented by to the firewall includes:
step B1-1, determining whether the current accessing object is an entry point object; if the current accessing object is an entry point object, going to step S4; if the current accessing object is not an entry point object, going to step B1-2;
step B1-2, determining whether the current accessing object is a global array object; if the current accessing object is a global array object, going to step S4; if the current accessing object is not a global array object, going to step C1.

The determining whether the current accessing object is an entry point object includes:
determining whether a first byte of the current accessing object is a first preset value.

The determining whether the current accessing object is a global array object includes:
determining whether a first byte of the current accessing object equals to an attribute value of the global array.

The attribute value of the global array comprises 0x70, 0x90, 0xB0, 0xD0 and 0xF0.

Before step S1, the method further includes:
step 1-1, receiving, by the Java card machine, an APDU (Applet Protocol Data Unit) application selection instruction, parsing the APDU application selection instruction and obtaining an application identifier from the APDU application selection instruction;
step 1-2, traversing all packets on the card according to the application identifier, searching for a packet index corresponding to the application identifier; traversing all application lists installed on the card according to the application identifier and searching for an application index corresponding to the application identifier;
step 1-3, computing an current context value of the current execution context according to the packet index and the application index.

The step 1-3 includes:
taking, by the Java card virtual machine, the packet index as high 4 bits, taking the application index as low 4 bits, a byte consisted of the high 4 bits and the low 4 bits is the current context value of the current execution context.

The invention has advantages of realizing multi-applet security management of a Java card, and particularly improving security between a plurality of applets by controlling access to a plurality of applets with a firewall detecting mechanism.

DETAILED DESCRIPTION

For clarifying purposes, technical solutions and advantages of the present invention, embodiments of the present invention are described in detail in conjunction with the drawings. Java program of one application in the below embodiments may considered as one applet.

Embodiment 1

Figure 1:
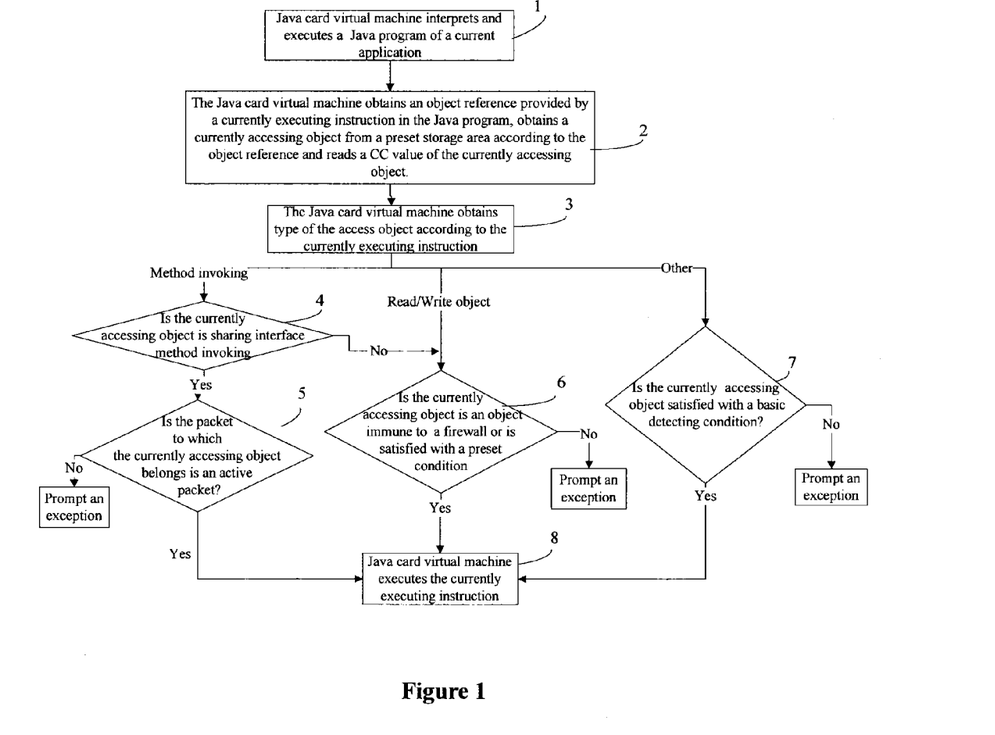
FIG. 1 is a flow chart of a control method for accessing a Java card object in accordance with Embodiment 1.

According to the embodiment, it is provided a control method for accessing a Java card object, as shown in FIG. 1, the method includes steps 1 to 8.

In step 1, a Java card virtual machine interprets and executes an applet of a current application.

In the embodiment, the applet of the currently application is comprised of a plurality of execution instructions, and the Java card virtual machine interprets and executes the applet of the current application by executing the execution instructions in turn.

Before the step 1, the method further includes steps 1-1 and 1-2.

Step 1-1, the Java card virtual machine receives an APDU application selection instruction, parses the APDU application selection instruction and obtains an application identifier (AID) from the APDU application selection instruction.

Further, there are a plurality of channels in a Java card, and correspondingly the step 1-1 may include:
The Java card virtual machine parses the APDU application selection instruction and obtains a current selected channel from the APDU application selection instruction, herein, the Java card virtual machine obtains the current selected channel according to the first byte of the APDU application selection instruction.

In step 1-2, the Java card virtual machine traverses all packets on the card according to the AID, searches for a packet index corresponding to the AID, and searches for an application index corresponding to the AID by traversing all application lists stalled on the card according to the AID.

Herein, the packet on the card includes a Java program of with an installed applet; a packet index of a packet on the card is used for identifying storage address of the packet; there is a one-to-one correspondence between the AID and the packet index; and there is a one-to-one correspondence between the AID and the application index in the application list.

Specifically the step includes that the Java card virtual machine interprets and executes the applet of the current application in the packet corresponding to the packet index.

Further, after step 1-2, the method may further include:
step 1-3, the Java card virtual machine computes a current context (CC) value of a current execution context according to the packet index and the application index.

Herein, the Java card virtual machine takes the packet index as high 4 bits, takes the application index as low 4 bits, a byte consisted of the high 4 bits and the low 4 bits is the current context value of the current execution context. Further, the CC value of the current execution context computed in the step is stored in a global variable corresponding to the current selected channel.

In step 2, the Java card virtual machine obtains an object reference provided by the current execution instruction in the applet, obtains a current accessing object from a preset storage area according to the object reference, and reads the CC value of the current accessing object.

In the embodiment, the preset storage area is used for storing all accessing objects. There is a one-to-one correspondence between the object reference and the accessing object stored in the preset storage area. The access object is comprised of an object header and a data field.

Step 2 may include: the Java card virtual machine interprets and executes the current execution instruction, obtains the corresponding object reference from a running stack of the Java card virtual machine according to a parameter in the current execution instruction, obtains the current accessing object corresponding to the object reference from the preset storage area, and reads the second byte of the current accessing object as the CC value of the current accessing object.

In step 3, the Java card virtual machine obtains a type of the current accessing object according to the current execution instruction.

If the type of accessing object is method invoking, step 4 is executed; if the type of the accessing object is a READ/WRITE object, step 6 is executed; if the type of the accessing object is other type, step 7 is executed.

Herein, the type of the current accessing object is method invoking, if the first byte of the current execution instruction is 0x8B or 0x8E; the type of the current accessing object is a READ/WRITE, if the first byte of the current execution instruction is any of 0x83, 0x84, 0x85, 0x86, 0x87, 0x88, 0x89, 0x90, 0xA9, 0xAA, 0xAB, 0xAC, 0xAD, 0xAE, 0xAF, 0xB0, 0xB1, 0xB2, 0xB3, 0xB4, 0xB5, 0xB6, 0xB7, 0xB8, 0x94; otherwise the current accessing object is other type. For example, it is indicated that the current accessing object is other type if the first byte of the current execution instruction is 0x93.

In step 4, the Java card virtual machine determines whether the type of the current accessing object is shared interface method invoking, if the type of the current accessing object is shared interface method invoking, step 5 is executed; and if the current accessing object is not shared interface method invoking, step 6 is executed.

Herein, it is determined whether the type of the current accessing object is shared interface method invoking according to the first byte of the current execution instruction and the current accessing object. If the first byte of the current execution instruction is 0x8E, the type of the current accessing object may be shared interface method invoking. Herein, the step of determining whether the type of the current accessing object is shared interface method invoking includes:
obtaining a reference of a type to which the interface method invoked by the current accessing object belongs; obtaining type information according to the reference, determining whether the current accessing object is shared interface method invoking according to the first byte of the type information. Herein, if the second bit of the first byte of the type information is 1, the current accessing object is shared interface method invoking.

In step 5, the Java card virtual machine determines whether the packet to which the current accessing object belongs is an active packet. If the packet to which the current accessing object belongs is an active packet, step 8 is executed; if the packet to which the current accessing object belongs is not an active packet, the Java card virtual machine prompts exception.

In the embodiment, the Java card virtual machine traverses all channels and determines whether the high 4 bits of the CC value of the current accessing object equal to the high 4 bits of a CC value stored in a channel. If the high 4 bits of the CC value of the current accessing object equal to the high 4 bits of a CC value stored in a channel, the packet to which the current accessing object belongs is an active packet and is permitted to be accessed; and if the high 4 bits of the CC value of the current accessing object do not equal to the high 4 bits of a CC value stored in some channel, an exception is prompted.

In step 6, the Java card virtual machine determines whether the current accessing object is prevented by a firewall or is satisfied with a basic detecting condition. If the current accessing object is not prevented by a firewall or is satisfied with a basic detecting condition, step 8 is executed; and if the current accessing object is prevented by a firewall or is not satisfied with a basic detecting condition, an exception is prompted.

In the embodiment, the object that is not prevented by a firewall includes an entry point object and a global array object.

The step of determining whether the current accessing object is satisfied with a basic detecting condition includes:
(1) The current execution context is a system context;
(2) The CC value of the current accessing object equals to the CC value of the current execution context.

If any of the above two conditions is satisfied with, the current accessing object is satisfied with the basic detecting condition.

In step 7, the Java card virtual machine determines whether the current accessing object is satisfied with the basic detecting condition. If the current accessing object is satisfied with the basic detecting condition, Step 8 is executed; if the current accessing object is not satisfied with the basic detecting condition, an exception is prompted.

The determining in step 7 is the same as the determining whether the basic detecting condition is satisfied with in Step 6, and thus it is unnecessary to go into the details here.

In step 8, the Java card virtual machine executes the current execution instruction.

Embodiment 2

Figure 2:
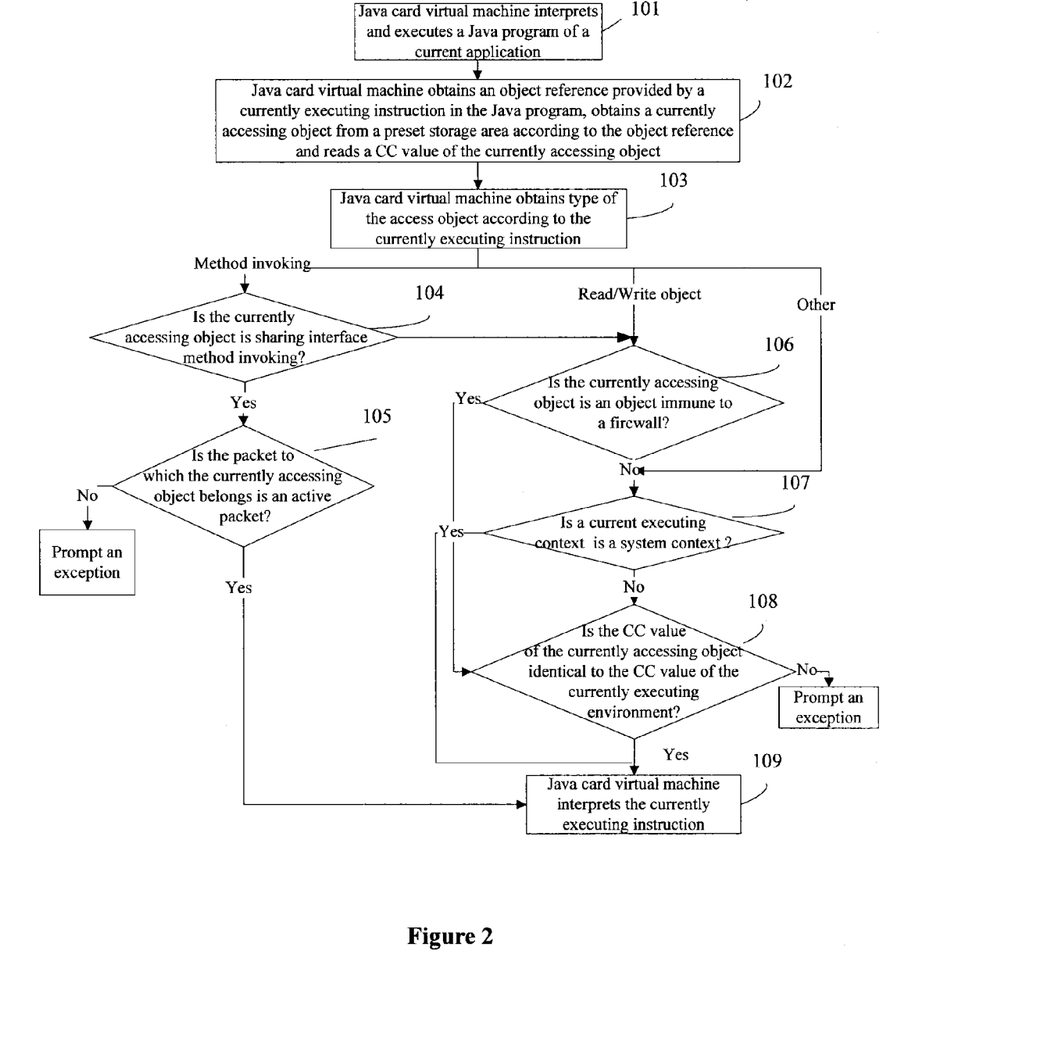
FIG. 2 is a flow chart of a control method for accessing a Java card object in accordance with Embodiment 2.

Based on Embodiment 1, a control method for accessing a Java card object is disclosed in the embodiment. As shown in FIG. 2, the method includes steps 101 to 109.

In step 101, a Java card virtual machine interprets and executes an applet of a current application.

In the embodiment, the applet of the current application is comprised of a plurality of execution instructions, and the Java card virtual machine interprets and executes the applet of the current application by executing the execution instructions in turn.

Before the step 101, the method further includes steps 1-1 and 1-2.

In step 1-1, the Java card virtual machine receives an APDU application selection instruction, parses the APDU application selection instruction and obtains an application identifier (AID) from the APDU application selection instruction.

The step 1-1 includes:
1) the Java card virtual machine determines whether the first four bytes of the received APDU application selection instruction are 00 A4 04 00. If the first four bytes of the received APDU application selection instruction are 00 A4 04 00, the operation goes on; and if the first four bytes of the received APDU application selection instruction are not 00 A4 04 00, an exception is prompted;

2) the Java card virtual machine obtains the length of the AID according to the fifth byte of the APDU application selection instruction; and 3) the Java card virtual machine reads data whose length is equal to the length of the AID in size of AID length from the sixth byte of the APDU application selection instruction as the obtained AID.

Further, there are a plurality of channels in a Java card and correspondingly the step 1-1 may include:

The Java card virtual machine parses the APDU application selection instruction and obtains a current selected channel from the APDU application selection instruction, herein, the Java card virtual machine obtains the current selected channel according to the first byte of the APDU application selection instruction.

In the embodiment, the Java card virtual machine receives 0x01 0xA4 0x04 0x00 0x08 0xA0 0x00 0x00 0x00 0x03 0x00 0x00 0x00, in which 0x01 0xA4 0x04 0x00 indicates that the received instruction is an APDU application selection instruction, 0x08 indicates the length of the following AID, and the AID obtained from the instruction is 0xA0 0x00 0x00 0x00 0x03 0x00 0x00 0x00, in which the first byte 0x01 indicates that the current selected channel is channel 1.

In step 1-2, the Java card virtual machine traverses all packets on the card according to the AID, searches for a packet index corresponding to the AID, and searches for an application index corresponding to the AID by traversing all application lists installed on the card according to the AID.

Herein, the packet on the card includes of the installed application; a packet index of a on the card is used for identifying storage address of the packet; there is a one-to-one correspondence between the AID and the packet index; and there is a one-to-one correspondence between the AID and the application index in the application list.

In the embodiment, if there are 3 packets on the card and the application corresponding to the AID is in the second packet, the Java card virtual machine traverses all packets on the card, and finds that the packet index is 2; if 3 applications are installed on the card and the application represented by the AID is the third application, the Java card traverses all application lists installed on the card to find that the application index is 3.

Specifically, the step includes: the Java card virtual machine interprets and executes the applet of the current application in the packet corresponding to the packet index.

After the step 1-2, the method further includes:

Step 1-3, the Java card virtual machine computes a current context (CC) value of a current execution context according to the packet index and the application index.

Herein, the Java card virtual machine takes the packet index as high 4 bits, takes the application index as low 4 bits, a byte consisted of the high 4 bits and the low 4 bits is the current context value of the current execution context.

Further, the CC value of the current execution context computed in the step is stored in a global variable corresponding to the current selected channel.

Specifically in the embodiment, the packet index found in the step 1-2 is 2, and the application index is 3, and thus the CC value of the current execution context computed by the Java card virtual machine according to the packet index and the application index is 23.

In step 102, the Java card virtual machine obtains an object reference provided by the current execution instruction in the applet, obtains a current accessing object from a preset storage address according to the object reference, and reads the CC value of the current accessing object.

In the embodiment, the preset storage area is used for storing all accessing objects. there is a one-to-one correspondence between the object reference and the accessing object stored in the preset storage area. The accessing object is comprised of an object header and a data field.

The step 102 includes: the Java card virtual machine interprets and executes the current execution instruction, obtains the corresponding object reference from a running stack of the Java card virtual machine according to a parameter in the current execution instruction, obtains the current accessing object corresponding to the object reference from the preset storage area and reads the second byte of the current accessing object.

In step 103, the Java card virtual machine obtains a type of the current accessing object according to the current execution instruction.

If the type of the accessing object is method invoking, the step 104 is executed; if the type of the accessing object is READ/WRITE, the step 106 is executed; if the type of the accessing object is other type, Step 107 is executed.

Herein, the type of the current accessing object is method invoking, if the first byte of the current execution instruction is 0x8B or 0x8E; the type of the current accessing object is READ/WRITE, if the first byte of the current execution instruction is any of 0x83, 0x84, 0x85, 0x86, 0x87, 0x88, 0x89, 0x90, 0xA9, 0xAA, 0xAB, 0xAC, 0xAD, 0xAE, 0xAF, 0xB0, 0xB1, 0xB2, 0xB3, 0xB4, 0xB5, 0xB6, 0xB7, 0xB8, 0x94; Otherwise the current accessing object is other type. For example, it is indicated that the current accessing object is other type if the first byte of the current execution instruction is 0x93.

In the embodiment, the type of the current accessing object is method invoking, specifically a case method invoking, if the current execution instruction is a invokevirtual instruction; the type of the current accessing object is method invoking, specifically an interface method invoking, if the current execution instruction is invokeinterface instruction; the type of the current accessing object is READ/WRITE, if the type of the current execution instruction is a getfield/putfield instruction. Further, the type of the current accessing object is a READ/WRITE common object, if the first byte of the current accessing is 0x20; the type of the current accessing object, the type of the current accessing object is a READ/WRITE array object, if the first type of the current accessing object is other value. For example, the values of the first byte of the accessing object being 0x60, 0x80, 0xA0, 0xC0, 0xE0 respectively refer to a Bull array, a byte array, a short array, an int array, a reference array. The type of the current accessing object is other type, specifically an exception is prompted, if the current execution instruction is an athrow instruction.

In step 104, the Java card virtual machines determines whether the current accessing object is shared interface method invoking. If the current accessing object is shared interface method invoking, step 105 is executed; if the current accessing object is not shared interface method invoking, step 106 is executed.

In the embodiment, the step of the Java card virtual machine determining whether the current accessing object is shared interface method invoking includes steps 2-1 to 2-3.

In step 2-1, determining whether the first byte of the current execution instruction is a third preset value. If the first byte of the current execution instruction is the third preset value, going to the next step; if the first byte of the current execution instruction is not the third preset value, the current accessing object is not shared interface method invoking.

Herein, the third preset value is 0x8E.

In step 2-2, searching for type information according to a reference of the type to which interface method belongs, invoked by the object provided by the current executing instruction.

In step 2-3, determining whether the current accessing object is shared interface method invoking according to the first byte of the type information.

Herein, if the second bit of the first byte of the type information is 1, the current accessing object is not shared interface method invoking.

In step 105, the Java card virtual machines determines whether the packet to which the current accessing object belongs is an active packet. If the packet to which the current accessing object belongs is an active packet, Step 109 is executed; if the packet to which the current accessing object belongs is not an active packet, an exception is prompted.

In the embodiment, the Java card virtual machine traverses all channels, determines whether the high 4 bits of the CC value of the current accessing object equal to the high 4 bits of a CC value stored in a channel. If high 4 bits of the CC value of the current accessing object equal to the high 4 bits of a CC value stored in a channel, the packet to which the current accessing object belongs is an active packet and the access is permitted to be accessed; otherwise, an exception is prompted.

In step 106, the Java card virtual machines determines whether the current accessing object is prevented by a firewall. If the current accessing object is prevented by a firewall, step 109 is executed; and if the current accessing object is not prevented by to a firewall, step 107 is executed.

The step of the Java card virtual machine determining whether the current accessing object is prevented by a firewall includes steps (1) and (2).

In step (1), determining whether the current accessing object is an entry point object. If the current accessing object is an entry point object, the current accessing object is permitted to be accessed and going to step 109; if the current accessing object is not an entry point object, going to the next step.

Herein, determining whether the first byte of the current accessing object is a first preset value. If the first byte of the current accessing object is the first preset value, the current accessing object is permitted to be accessed; if the first byte of the current accessing object is not a first preset value, going to the next step.

In the embodiment, the first preset value is 0x28.

In step (2), determining whether the current accessing object is a global array object. If the current accessing object is a global array object, the current accessing object is permitted to be accessed and going to Step 109; if the current accessing object is not a global array object, going to step 107.

Herein, determining whether the first byte of the current accessing object matches with the attribute value of the global array. If the first byte of the current accessing object matches with the attribute value of the global array, the current accessing object is permitted to be accessed and going to step 109; if the first byte of the current accessing object does not match with the attribute value of the global array, going to step 107.

Specifically in the embodiment, the attribute value of the global array being 0x70, 0x90, 0xB0, 0xD0 and 0xF0 respectively indicate that the current accessing object is a global boolean array, a global byte array, a global Short array, a global Int array and a global reference array.

Further, the step (1) and step (2) are unordered.

In step 107, the Java card virtual machine determines whether the current execution context is a system context. If the current execution context is a system context, step 109 is executed; if the current execution context is not a system context, step 108 is executed.

Herein, determining whether the CC value of the current execution context is a second preset value. If the CC value of the current execution context is the second preset value, the current accessing object is permitted to be accessed and going to Step 109; if the CC value of the current execution context is not the second preset value, going to step 108.

In the embodiment, the second preset value is 0x00.

In step 108, the Java card virtual machine determines whether the CC value of the current accessing object equals to the CC value of the current execution context. If the CC value of the current accessing object equals to the CC value of the current execution context, the current accessing object is permitted to be accessed and going to step 109; if the CC value of the current accessing object does not equal to the CC value of the current execution context, an exception is prompted.

Herein, the determining in step 108 includes determining whether the second byte of the current accessing object equals to the CC value of the current execution context. If the second byte of the current accessing object equals to the CC value of the current execution context, the current accessing object is permitted to be accessed; if the second byte of the current accessing object equals to the CC value of the current execution context, an exception is prompted.

Further, Steps 106, 107 and 108 are unordered.

In step 109, the Java card virtual machine executes the current execution instruction.

Embodiment 3

Based on Embodiment 1 or Embodiment 2, according to the embodiment, a control method for accessing a Java object is described by taking a specific accessing object type as an example. The Java card virtual machine obtains a corresponding object reference from a running stack of the Java card virtual machine when it interpreting and executing a current execution instruction. In the embodiment, a CC value of a system context is 0x00 and a CC value of the current execution context obtained from a received APDU application selection instruction is 0x21.

If the current execution instruction is 0xAE 0x03, an object reference obtained from a running stack of the Java card virtual machine is 0x96, it is determined that the current execution instruction is a getfield_b_this instruction according to the first byte of the current execution instruction, and the type of the current accessing object is Read/Write. The Java card virtual machine executes the steps A1 to A4 before accessing the current accessing object.

In step A1, acquiring that the current accessing object is 0x20 0x00 0x00 0x13 0x04 0x00 0x01 0x00 0x08 0x00 0x05 according to the object reference, and the type of the current accessing object is READ/WRITE according to the first byte of the current accessing object.

In step A2, acquiring a CC value of the current accessing object according to the second byte of the current accessing object.

Herein, the CC value of the current accessing object is 0x00.

In step A3, determining whether the current execution context is a system context. If the current execution context is a system context, the current accessing object is permitted to be accessed; if the current execution context is not a system context, going to the next step.

Herein, in the embodiment, it is determined that the CC value of the current execution context 0x21 is different from the CC value of the system context 0x00, and thus the next step is executed.

In step A4, determining whether the CC value of the current accessing object equals to the CC value of the current execution context. If the CC value of the current accessing object equals to the CC value of the current execution context, the current accessing object is permitted to be accessed; if the CC value of the current accessing object does not equal to the CC value of the current execution context, an exception is prompted.

In the embodiment, the CC value of the current accessing object 0x00 does not equal to the CC value of the current execution context 0x21, and an exception is prompted.

Further, if the determining result indicated that the current accessing object is permitted to be accessed, acquiring data of the current accessing object according to the second byte of the current execution instruction. Specifically, the second byte 0x03 indicates the number of the data to be extracted. The step of permitting to access the current accessing object includes that the Java card virtual machine extracts the third group of data 0x00 0x05 from data of the current accessing object 0x20 0x00 0x00 0x13 0x04 0x00 0x01 0x00 0x08 0x00 0x05. Every two bytes constitute a unit, the first five bytes 0x20 0x00 0x00 0x13 0x04 refer to an object header and the rest bytes refer to data.

If the current execution instruction is 0x26, the object reference obtained from the running stack of the Java card virtual machine is 0x83, a loading instruction (saload instruction) is acquired according to the first byte of the current execution instruction; and the type of the current accessing object is Read/Write. The Java card virtual machine executes the steps B1 to B5 before accessing the current accessing object.

In step B1, acquiring the current accessing object is 0xA0 0x00 0x00 0x0A 0x16 0x00 0x0A 0x00 0x03 0x00 0x08 0x00 0x38 0x00 0x12 0x00 0x35 0x00 0x06 0x00 0x07 0x00 0x08 0x00 0x09 0x00 0x0A according to the object reference, and the CC value of the current accessing object is 0x00 according to the second byte of the current accessing object.

In step B2, determining whether the current accessing object is a global array object. If the current accessing object is a global array object, the current accessing object is permitted to be accessed; if the current accessing object is not a global array object, going to the next step.

In the embodiment, it is acquired that the current accessing object is a public array object according to the first byte of the current accessing object 0xA0.

Further, going to step B3 if the determining result indicates that the current accessing object is not a global array object.

In step B3, determining whether the current accessing object is an entry point object. If the current accessing object is an entry point object, the current accessing object is permitted to be accessed; if the current accessing object is not an entry point object, going to the next step.

Herein, determining whether the fifth bit of the first byte of the current accessing object is 1 (from the low bit to the high bit). If the fifth bit of the first byte of the current accessing 0xA0 is 1, the current accessing object is permitted to be accessed.

In step B4, determining whether the current execution context is a system context. If the current execution context is a system context, the current accessing object is permitted to be accessed; if the current execution context is not a system context, going to the next step.

Herein, in the embodiment, it is determined that the CC value of the current execution context does not equal to the CC value of the system context, going to the next step.

In step B5, determining whether the CC value of the current accessing object equals to the CC value of the current execution context. If the CC value of the current accessing object equals to the CC value of the current execution context, the current accessing object is permitted to be accessed; if the CC value of the current accessing object does not equal to the CC value of the current execution context, an exception is prompted.

In the embodiment, the CC value of the current accessing object 0x00 does not equal to the CC value of the current executing context 0x21, and an exception is prompted.

If the current execution instruction is 0x93, the object reference obtained from the running stack of the Java card virtual machine is 0x90; if the current execution instruction is an athrow instruction for throwing an exception object from the running stack of the virtual machine, the Java card virtual machine executes steps C1 to C3 before accessing the exception object.

In step C1, acquiring the current accessing object is 0x28 0x00 0x00 0x6B 0x04 0xFC 0x08 according to the object reference, and the CC value of the current accessing object is 0x00 according to the second byte of the current accessing object.

In step C2, determining whether the current execution context is a system context. If the current execution context is a system context, the current accessing object is permitted to be accessed; if the current execution context is not a system context, going to the next step.

In step C3, determining whether the CC value of the current accessing object equals to the CC value of the current execution context. If the CC value of the current accessing object equals to the CC value of the current execution context, the current accessing object is permitted to be accessed; if the CC value of the current accessing object does not equal to the CC value of the current execution context, an exception is prompted.

If the current execution instruction is 0x8E, 1, 0x0002, 2, the object reference obtained from the Java card virtual machine is 0x68. It is acquired that the current execution instruction is invokeinterface according to the first byte of the current execution instruction, and the type of the current accessing object is method invoking. Since the second byte of current execution instruction is 1, it is acquired that the invoked method has one parameter. It is acquired that the reference of the type to which the invoked method belongs according to the third and fourth bytes of the current execution instruction. It is acquired that the ID of the invoked method according to fifth byte of the current execution instruction, the ID represents the index of the invoked method in the type virtual method table. The Java card virtual machine executes the steps E1 to E4 before accessing the current accessing object.

In step E1, acquiring the current accessing object is 0x20 0x01 0x02 0x05 0x08 according to the object reference, and the CC value of the current accessing object is 0x01 according to the second byte of the current accessing object.

In step E2, determining whether the current accessing object is shared interface method invoking. If the current accessing object is shared interface method invoking, going to step E3; if the current accessing object is not shared interface method invoking, going to step E4.

In the embodiment, type information of the interface invoked by the object is found according to 0x0002 provided in the instruction. It is determined that whether the current accessing object is shared interface method invoking according to the first byte of the type information. Preferably, if the second bit of the first byte of the type information is 1, the current accessing object is shared interface method invoking.

For example, it is found that the type information is 0x81, 0x00, 0x00 according to 0x0002 provided in the invokeinterface instruction. Since the first byte of the type address is 0x81, the first bit of the type address (10000001) is 0, and it is indicated that the type is not shared interface method invoking.

In step E3, determining whether the packet to which the current accessing object belongs is an active packet. If the packet to which the current accessing object belongs is an active packet, the current accessing object is permitted to be accessed; if the packet to which the current accessing object belongs is not an active packet, an exception is prompted.

Specifically in the embodiment, the Java card virtual machine traverses all channels and determines whether the high 4 bits of CC value of the current accessing object equal to the high bits of CC value stored in a channel. If the high 4 bits of CC value of the current accessing object equal to the high bits of CC value stored in the channel, the packet to which the current accessing object belongs is an active packet, the current accessing object is permitted to be accessed. Otherwise, an exception is prompted.

For example, there are two channels on the card, the CC value stored in the first channel is 0x00; the CC value stored in the second channel is 0x40. And the high 4 bits of the CC value 0x00 in the first channel equal to the high 4 bits of the CC value of the current accessing object 0x01 therefore, the packet to which the current accessing object belongs is an active packet.

In step E4, determining whether the current accessing object is prevented by a firewall or is satisfied with a basic detecting condition. If the current accessing object is not prevented by a firewall or is satisfied with the basic detecting condition, the current accessing object is permitted to be accessed; if the current accessing object is prevented by a firewall or is not satisfied with the basic detecting condition, an exception is prompted.

Specifically, the step of determining whether the current accessing object is prevented by a firewall or is satisfied with a basic detecting condition is described above, and it is unnecessary to describe herein.

The above are only the embodiments of the invention and are not limit to the scope of protection of the invention. Any change or substitute within the technical scope of the invention by any one skilled in the art should fall within the scope of protection of the invention. Therefore, scope of protection of the invention should be based on the claims.

The invention claimed is:

1. A control method for accessing a Java card object comprising:
   step S1, interpreting and executing, by a Java card virtual machine, an applet of a current application;
   step S2 that includes sub-steps obtaining, by the Java card virtual machine, an object reference provided by a current execution instruction in the applet, obtaining a current accessing object from a preset storage area according to the object reference, and reading a current context value of the current accessing object;
   step S3, obtaining, by the Java card virtual machine, a type of the current accessing object according to the current execution instruction, wherein, if the type of the current accessing object is method invoking, going to step A1, wherein, if the type of the current accessing object is a READ/WRITE object, going to step B1, and wherein if the type of the current accessing object is neither the method invoking nor the READ/WRITE object, going to step C1;
   step A1, determining whether the current accessing object is a shared interface method invoking object, wherein, if the current accessing object is a shared interface method invoking object, going to step A2, and wherein, if the current accessing object is not a shared interface method invoking object, going to step B1;
   step A2, determining whether a packet to which the current accessing object belongs is an active packet based on the current context value of the current accessing object, wherein, if the packet to which the current accessing object belongs is an active packet, going to step S4, and wherein, if the packet to which the current accessing object belongs is not an active packet, prompting an exception;
   step B1, determining whether the current accessing object is prevented by a firewall or satisfied a basic detecting condition, wherein, if the current accessing object is not prevented by the firewall or satisfies the basic detecting condition, going to step 54, and wherein, if the current accessing object is prevented by the firewall or does not satisfy the basic detecting condition, prompting an exception;
   step C1, determining whether the current accessing object satisfies the basic detecting condition, wherein, if the current accessing object satisfies the basic detecting condition, going to step S4, and wherein, if the current accessing object does not satisfy the basic detecting condition, prompting an exception; and
   step S4, executing, by the Java card virtual machine the current executing instruction,
   wherein the determining whether the packet to which the current accessing object belongs is an active packet based on the current context value of the current accessing object comprises:
   traversing, by the Java card virtual machine, all channels;
   comparing a packet index in the current context value of the current accessing object with values respectively stored in the channels, wherein the packet index indicates a storage address of the packet to which the current accessing object belongs; and
   determining whether there exists a channel storing the value which equals to the packet index,
   wherein the packet to which the current accessing object belongs is an active packet if there exists a channel storing the value which equals to the packet index, and
   wherein the packet to which the current accessing object belongs is not an active packet if there does not exist a channel storing the value which equals to the packet index.

2. The controlling method according to claim 1, wherein step S2 comprises sub-steps:
   obtaining, by the Java card virtual machine, the object reference from a running stack of the Java card virtual machine according to a parameter in the current execution instruction, obtaining the current accessing object corresponding to the object reference from the preset storage area, and reading a second byte of the current accessing object as the current context value of the current accessing object.

3. The controlling method according to claim 1, wherein the determining whether the current accessing object is a shared interface method invoking object in step A1 comprises:
    step 2-1, determining whether a first byte of the current execution instruction is a third preset value, wherein, if the first byte of the current execution instruction is the third preset value, going to a next step, and wherein, if the first byte of the current execution instruction is not the third preset value, the current accessing object is not a shared interface method invoking object;
    step 2-2, wherein step 2-2 comprises sub-steps obtaining a reference of the type of the current accessing object according to the current execution instruction and obtaining type information according to the reference of the type of the current accessing object; and
    step 2-3, determining whether the current accessing object is a shared interface method invoking object according to a first byte of the type information.

4. The controlling method according to claim 3, wherein the current accessing object is a shared interface method invoking object if second bit of the first byte of the type information is 1.

5. The controlling method according to claim 1, wherein the packet index in the current context value of the current accessing object is high 4 bits in the current context value of the current accessing object.

6. The controlling method according to claim 1, wherein the current accessing object that is not prevented by the firewall in Step B1 comprises an entry point object and a global array object.

7. The controlling method according to claim 1, wherein determining whether the current accessing object satisfies the basic detecting condition in steps B1 and C1 comprises:
    determining if a current execution context is a system context or if the current context value of the current accessing object equals a current context value of the current execution context.

8. The controlling method according to claim 1, wherein step C1 comprises:
    step C1-1, determining whether a current execution context is a system context, wherein, if the current execution context is a system context, going to step S4, and wherein, if the current execution context is not a system context, going to Step C1-2;
    step C1-2, determining whether the current context value of the current accessing object equals the current context value of the current execution context, wherein, if the current context value of the current accessing object equals the current context value of the current execution context, going to step S4; and wherein, if the current context value of the current accessing object does not equal the current context value of the current execution context, prompting an exception.

9. The controlling method according to claim 8, wherein step B1 comprises:
    determining whether the current accessing object is prevented by the firewall, wherein, if the current accessing object is not prevented by the firewall, going to step S4, and wherein, if the current accessing object is prevented by the firewall, going to step C1.

10. The controlling method according to claim 8, wherein the determining whether the current execution context is a system context comprises:
    determining whether the current context value of the current execution context is a second preset value.

11. The controlling method according to claim 9, wherein the determining whether the current accessing object is prevented by the firewall comprises:
    step B1-1, determining whether the current accessing object is an entry point object, wherein, if the current accessing object is an entry point object, going to step S4, and wherein, if the current accessing object is not an entry point object, going to step B1-2;
    step B1-2, determining whether the current accessing object is a global array object, wherein, if the current accessing object is a global array object, going to step S4, and wherein, if the current accessing object is not a global array object, going to step C1.

12. The controlling method according to claim 11, wherein the determining whether the current accessing object is an entry point object comprises:
    determining whether a first byte of the current accessing object is a first preset value.

13. The controlling method according to claim 11, wherein the determining whether the current accessing object is the global array object comprises:
    determining whether a first byte of the current accessing object equals an attribute value of the global array object.

14. The controlling method according to claim 13, wherein the attribute value of the global array object comprises 0x70, 0x90, 0xB0, 0xD0 and 0xF0.

15. The controlling method according to claim 1, wherein before step S1, the method further comprises:
    step 1-1, wherein step 1-1 comprises sub-steps receiving, by the Java card machine, an Applet Protocol Data Unit (APDU) application selection instruction, parsing the APDU application selection instruction and obtaining an application identifier from the APDU application selection instruction;
    step 1-2, wherein step 1-2 comprises sub-steps traversing all packets on the card according to the application identifier, searching for a packet index corresponding to the application identifier, traversing all application lists installed on the card according to the application identifier and searching for an application index corresponding to the application identifier; and
    step 1-3, computing a current context value of a current execution context according to the packet index and the application index.

16. The controlling method according to claim 15, wherein step 1-3 comprises sub-steps:
    taking, by the Java card virtual machine, the packet index as high 4 bits, taking the application index as low 4 bits, wherein a byte consisting of the high 4 bits and the low 4 bits is the current context value of the current execution context.

* * * * *